(12) United States Patent
Chai et al.

(10) Patent No.: US 8,438,616 B2
(45) Date of Patent: *May 7, 2013

(54) METHOD FOR TERMINAL CONFIGURATION AND MANAGEMENT AND TERMINAL DEVICE

(75) Inventors: Xiaoqian Chai, Shenzhen (CN); Linyi Tian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/253,751

(22) Filed: Oct. 5, 2011

(65) Prior Publication Data

US 2012/0030741 A1 Feb. 2, 2012

Related U.S. Application Data

(63) Continuation of application No. 13/073,616, filed on Mar. 28, 2011, which is a continuation of application No. PCT/CN2009/074247, filed on Sep. 27, 2009.

(30) Foreign Application Priority Data

Sep. 28, 2008 (CN) .......................... 2008 1 0169526

(51) Int. Cl.
*H05L 29/06* (2006.01)

(52) U.S. Cl.
USPC .......... 726/4; 726/2; 726/3; 726/10; 719/319; 719/320; 719/313; 719/316; 719/317; 709/220; 709/222; 709/221; 709/223

(58) Field of Classification Search .......................... None
See application file for complete search history.

(56) References Cited

U.S. PATENT DOCUMENTS

| 5,404,528 | A | * | 4/1995 | Mahajan | 719/320 |
| 6,389,464 | B1 | * | 5/2002 | Krishnamurthy et al. | 709/220 |
| 7,082,460 | B2 | * | 7/2006 | Hansen et al. | 709/220 |
| 7,668,943 | B2 | * | 2/2010 | Liu | 709/221 |

(Continued)

FOREIGN PATENT DOCUMENTS

| CN | 1968427 A | 5/2007 |
| CN | 101010907 A | 8/2007 |

(Continued)

OTHER PUBLICATIONS

International Search Report issued Dec. 31, 2009 in connection with International Patent Application No. PCT/CN2009/074247.

(Continued)

*Primary Examiner* — Nathan Flynn

(57) ABSTRACT

A method for terminal configuration and management includes: acquiring a configuration file, where the configuration file includes server account information; configuring the server account information in the acquired configuration file onto a Device Management Tree (DMT) of a terminal; based on the server account information, establishing a management session between the terminal and the server, and performing management and subsequent configuration on the terminal during the session. A corresponding terminal device and a corresponding system are also provided. Through the method, the terminal can determine, according to protocol version information supported by or corresponding to the corresponding server and carried in a configuration packet, a protocol that should be used for communication with a server, and perform configuration according to the correct protocol version, thus improving the operation efficiency.

5 Claims, 6 Drawing Sheets

U.S. PATENT DOCUMENTS

| | | | |
|---|---|---|---|
| 7,774,821 B2 * | 8/2010 | Dunn et al. | 725/151 |
| 7,889,684 B2 * | 2/2011 | Chai et al. | 370/259 |
| 8,001,231 B2 * | 8/2011 | He | 709/223 |
| 8,014,294 B2 * | 9/2011 | Sun | 370/241 |
| 8,139,509 B2 * | 3/2012 | Krivopaltsev | 370/255 |
| 8,159,960 B2 * | 4/2012 | Cooppan | 370/252 |
| 8,161,150 B2 * | 4/2012 | Kim | 709/223 |
| 8,209,676 B2 * | 6/2012 | Kapadekar et al. | 717/171 |
| 2002/0099661 A1 * | 7/2002 | Kii et al. | 705/51 |
| 2002/0112047 A1 * | 8/2002 | Kushwaha et al. | 709/223 |
| 2005/0027841 A1 * | 2/2005 | Rolfe | 709/223 |
| 2005/0055397 A1 * | 3/2005 | Zhu et al. | 709/200 |
| 2005/0079869 A1 * | 4/2005 | Khalil et al. | 455/435.1 |
| 2005/0216419 A1 * | 9/2005 | Lee et al. | 705/59 |
| 2006/0026228 A1 * | 2/2006 | Kim | 709/202 |
| 2006/0031449 A1 * | 2/2006 | Hallamaa et al. | 709/223 |
| 2006/0143179 A1 * | 6/2006 | Draluk et al. | 707/9 |
| 2006/0212558 A1 * | 9/2006 | Sahinoja et al. | 709/223 |
| 2006/0236325 A1 * | 10/2006 | Rao et al. | 719/315 |
| 2007/0049265 A1 * | 3/2007 | Kaimal et al. | 455/423 |
| 2007/0093243 A1 * | 4/2007 | Kapadekar et al. | 455/419 |
| 2007/0127663 A1 | 6/2007 | Bae et al. | |
| 2007/0158404 A1 * | 7/2007 | Li et al. | 235/375 |
| 2007/0165654 A1 * | 7/2007 | Chai et al. | 370/401 |
| 2007/0192158 A1 * | 8/2007 | Kim | 705/9 |
| 2007/0294385 A1 * | 12/2007 | Kapadekar et al. | 709/223 |
| 2008/0046583 A1 * | 2/2008 | Rao | 709/230 |
| 2008/0091815 A1 * | 4/2008 | Rao | 709/223 |
| 2008/0104207 A1 * | 5/2008 | Pulkkinen et al. | 709/220 |
| 2008/0104217 A1 | 5/2008 | Srinivasa et al. | |
| 2008/0114570 A1 * | 5/2008 | Li et al. | 702/186 |
| 2008/0189404 A1 * | 8/2008 | He et al. | 709/223 |
| 2009/0077215 A1 * | 3/2009 | Jayanthi | 709/223 |

FOREIGN PATENT DOCUMENTS

| | | |
|---|---|---|
| CN | 101106570 A | 1/2008 |
| WO | WO 2008/022195 A1 | 2/2008 |
| WO | WO 2008/060042 A1 | 5/2008 |

OTHER PUBLICATIONS

"DM Possible Future Functionality", Open Mobile Alliance, Nov. 25, 2007, 7 pages.

Peter C. Thompson, "Harmonization of DM 1.x and 2.x work", Open Mobile Alliance, Apr. 28, 2008, 4 pages.

Communication dated Feb. 7, 2012 in connection with European Patent Application No. 09 815 626.8.

"Provisioning Content Version 1.1", Open Mobile Alliance, Jul. 20, 2004, 76 pages.

"OMA Device Management Standardized Objects", Version 1.2, Open Mobile Alliance, Feb. 9, 2007, 29 pages.

"OMA Device Management Notification Initiated Session", Version 1.2, Feb. 9, 2007, 16 pages.

OMA Device Management Security, Version 1.2, Feb. 9, 2007, 27 pages.

"OMA Device Management Bootstrap", Version 1.2, Feb. 9, 2007, 28 pages.

Office Action dated Feb. 3, 2012 in connection with U.S. Appl. No. 13/073,616.

Office Action dated Aug. 8, 2012 in connection with U.S. Appl. No. 13/073,616, 21 pages.

Translation of Korean Office Action dated Aug. 8, 2012, in connection with Korean Patent Application No. 10-2011-7008768; 5 pages.

Written Opinion of International Searching Authority dated Dec. 31, 2009 in connection with International Patent Application No. PCT/CN2009/074247, 3 pages.

European Office Action dated Oct. 8, 2012 in connection with European Patent Application No. 09815626.8, 9 pages.

* cited by examiner

METHOD FOR TERMINAL CONFIGURATION AND MANAGEMENT AND TERMINAL DEVICE

CROSS-REFERENCE TO RELATED APPLICATIONS

This application is a continuation of U.S. patent application Ser. No. 13/073,616, filed on Mar. 28, 2011, which is a continuation of International Application No. PCT/CN2009/074247, filed on Sep. 27, 2009. The International Application claims priority to Chinese Patent Application No. 200810169526.7, filed on Sep. 28, 2008. The afore-mentioned patent applications are hereby incorporated by reference in their entireties.

TECHNICAL FIELD

The present invention relates to the field of communication technologies, and more particularly to a method for terminal configuration and management, and a terminal device.

BACKGROUND

With the increase of mobile communication services, the complexity of mobile terminals is increased continuously, and the demand for over the air (OTA) management and configuration of mobile terminals becomes more and more urgent. In order to achieve secure OTA management of mobile terminals, the Open Mobile Alliance (OMA) has developed a Device Management (DM) protocol, which mainly provides a set of session-based communication mechanisms between a managing server and a managed terminal, including management session mechanism, management session security, management message format and constraint in a management session, and data model-Management Object (MO). In order to realize specific management functions on the terminal, an application data model-Management Object, for example, Firmware Update Management Object (FUMO) and Software Component Management Object (SCOMO), is developed on the basis of the DM Protocol.

A terminal device supporting the OMA DM function must have a DM client (software), which is responsible for OMA DM protocol resolution, session management, and session security. The device supporting the OMA DM function must further include a data structure—Device Management Tree (DMT), where the DMT organizes all the available management objects in the device together, and all nodes in the DMT can be located by a unique Unified Resource Identity (URI).

The OMA DM completes the management through two processes: One is an initial configuration (Bootstrap) process, for configuring a device from an unmanageable state into a manageable state, mainly configuring an account of the server, and information such as connection parameters may also be configured; and the other is a management process, for completing subsequent management.

In the implementation of the present invention, the inventor finds that the prior art has at least the following technical defects. In the prior art, the terminal cannot determine whether a configuration is suitable for the terminal during the configuration, and the terminal cannot perform the configuration effectively. Meanwhile, the terminal needs to perform negotiation or attempts to determine which protocol version is used to initiate a session, which makes the session more complex. Furthermore, during the subsequent management, the terminal may have multiple pieces of authentication information, and it is rather difficult for the server and the terminal to determine that the same authentication information is used for a session trigger message, thus increasing the difficulty for the terminal to authenticate the session trigger message. Moreover, the terminal can only authenticate and process a single parameter configuration message, so that the efficiency is very low, and the load of the channel and the server is heavy.

SUMMARY

Embodiments of the present invention provide a method for terminal configuration and management and a terminal device, which enable a configuration according to a correct protocol version, thus improving the operation efficiency.

A method for terminal configuration and management provided in an embodiment of the present invention includes the following steps.

A configuration file is acquired, where the configuration file includes server account information and session protocol version information supported or selected by a server corresponding to the server account.

The session protocol version information is extracted, and it is determined, according to the session protocol version information, whether the server account is suitable for a terminal.

If the server account is suitable for the terminal, the server account information in the acquired configuration file is configured onto a DMT of the terminal.

Based on the configured server account, a management session is established with the server, to perform management and subsequent configuration on the terminal.

Another method for terminal configuration and management provided in an embodiment of the present invention includes the following steps.

Account information of a server is configured onto a DMT of a terminal, where the server account information includes one or more pieces of authentication information.

A session trigger message, delivered by the server and carrying server identity authentication information and a server identifier, is received.

A Message Digest 5 (MD5) digest is generated by using the authentication information included in the server account information on the DMT corresponding to the server identifier, to authenticate the session trigger message.

After the authentication succeeds, a management session between the terminal and the server is established based on the session trigger message, and management and subsequent configuration are performed on the terminal during the session.

Still another method for terminal configuration and management provided in an embodiment of the present invention includes the following steps.

A DM server account is configured, where the DM server account includes a DM server identifier and authentication information.

A configuration message generated, based on the DM protocol, by the DM server, is received, where the configuration message carries the DM server identifier, a used protocol version, and DM server identity authentication information, and the configuration message is used for parameter configuration or management.

The authentication information is extracted from the DM server account according to the DM server identifier, and the configuration message is authenticated by using the authentication information.

If the authentication succeeds, an access control right of the DM server to a target management node on a DMT of a terminal is determined according to the DM server identifier, and a management command carried in the configuration message is executed based on the access control right.

A terminal provided in an embodiment of the present invention includes a configuration file acquiring unit, a server account determining unit, and a configuration unit.

The configuration file acquiring unit is adapted to acquire a configuration file, where the configuration file includes a server account and session protocol version information supported by a corresponding server, and/or the configuration file includes a DM server identifier and authentication information.

The server account determining unit is adapted to extract the session protocol version information, and determine, based on the session protocol version information and a protocol version supported by the terminal, whether the server account is suitable for the terminal.

The configuration unit is adapted to configure the server account onto a DMT of the terminal.

Another terminal provided in an embodiment of the present invention includes a configuration file acquiring unit, a configuration unit, and a trigger message authentication unit.

The configuration file acquiring unit is adapted to acquire a configuration file, where the configuration file includes a server account and authentication information.

The configuration unit is adapted to configure the server account onto a DMT of the terminal.

The trigger message authentication unit is adapted to, according to a DM server identifier and authentication information that are acquired by the configuration file acquiring unit, authenticate a received session trigger message by using authentication information corresponding to an authentication type, an authentication name, or an authentication type identifier carried in the trigger message, where the authentication information is included in the server account.

An embodiment of the present invention further provides a system for terminal configuration and management, where the system includes a DM server and a DM client.

The DM server is adapted to generate a configuration message that is based on a DM protocol, where the configuration message carries a DM server identifier and authentication information.

The DM client is adapted to authenticate the DM server according to the DM server identifier and an authentication type that are carried in the configuration message, determine, according to the DM server identifier, an access control right of the DM server to a target management node on a DMT of a terminal, and execute, based on the access control right, a management command carried in the configuration message.

To conclude, in the technical solutions provided in embodiments of the present invention, when performing initial configuration, according to protocol version information supported by or corresponding to a corresponding server and carried in the configuration file, the terminal can identify a protocol version corresponding to a configuration file, so that the terminal can determine whether the packet is suitable for the terminal, so as to perform a correct configuration. When the terminal is capable of supporting a plurality of protocol versions, the terminal can determine, according to the protocol version information supported by or corresponding to the corresponding server and carried in the configuration packet, a protocol that should be used for communication with the server, thus eliminating the problem of increased communication traffic due to different protocol versions.

Furthermore, through the batch parameter configuration method, secure delivery of batch general management operations such as parameter configuration can be effectively completed, thus improving the operation efficiency, reducing the occupation of the channel, and lightening the load of the server.

DETAILED DESCRIPTION

Embodiments of the present invention provide a method for terminal configuration and management, where the method is described with reference to some exemplary embodiments.

In the OMA DM, a DMT of a terminal is an interface between a DM server (hereinafter referred to as a server) and the terminal. In order to establish a management session between the server and the terminal and complete application layer authentication, before performing subsequent management, a device needs to be transited from an unmanageable state to a manageable state, and in the OMA DM, the process is referred to as initial configuration (Bootstrap), and is mainly to configure server account information to the terminal.

Figure 1:
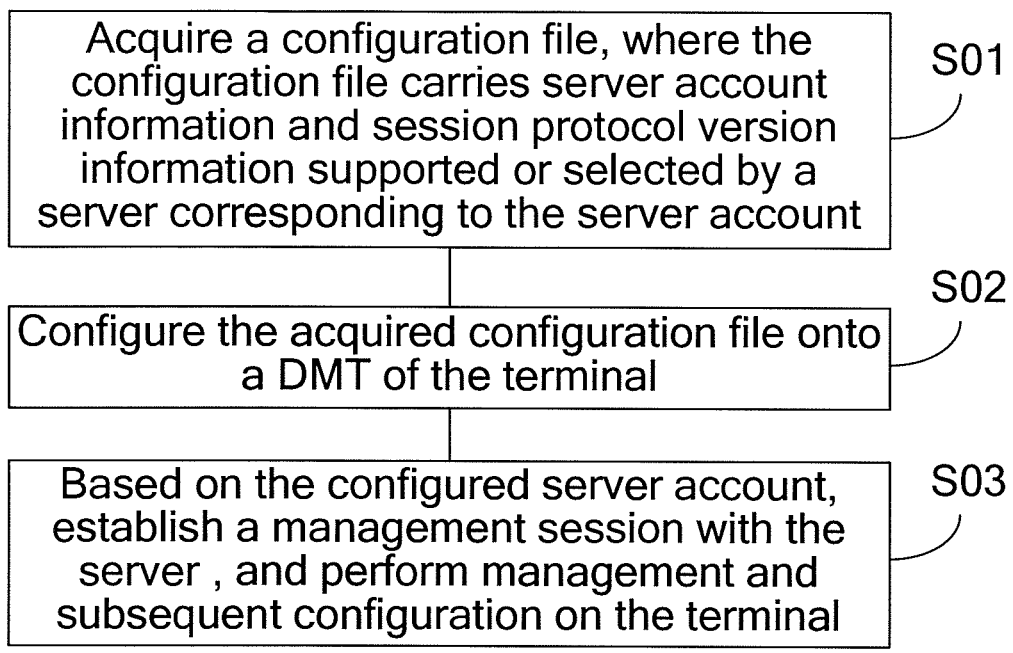
FIG. 1 is a schematic diagram showing a flowchart of terminal configuration according to an embodiment of the present invention.

Referring to FIG. 1, a method for terminal configuration and management according to a first embodiment of the present invention includes the following steps.

In step S01, a configuration file is acquired, where the configuration file carries server account information and session protocol version information supported or selected by a server corresponding to the server account.

Specifically, the configuration file is acquired in a PULL mode, and before acquiring the configuration file, an address of the configuration file is first acquired, and then the configuration file is acquired according to the address. If the address is a request address, a request message for acquiring the configuration file is sent to the request address, where the request message further carries one or more of the following: an identifier of the terminal, service subscriber information, a subscriber identity authentication code, device information, and a supported DM version, and the server selects the configuration file according to the carried information and delivers the configuration file to the terminal.

The configuration file includes the session protocol version information supported by the corresponding server.

In step S02, the server account information in the acquired configuration file is configured onto a DMT of the terminal.

The configuration method is: determining a position on the DMT, and mapping the determined server account information to be a Device Management Account (DMAcc) Management Object instance in the position.

If the acquired configuration file includes the session protocol version information supported by the corresponding server, the session protocol version information is extracted, it is determined whether the server account is suitable for the terminal, and the account is configured when the account is suitable for the terminal. The session protocol version information is mapped to be a value or a field of a leaf node of the DMAcc Management Object instance.

In step S03, based on the configured server account, a management session is established with the server, and management and subsequent configuration are performed on the terminal.

After the configuration is completed, the terminal may establish a management session with the server. The management session may be triggered by the terminal or the server. If the session is triggered by the server, the configured account information must include authentication information used by a session trigger message, so as to use the authentication information to authenticate the session trigger message. In order to complete the authentication, an authentication type needs to be designated in advance, or the trigger message carries an authentication type or an authentication name, or an authentication type determination rule is predetermined, and the authentication type is determined according to the rule, so that the terminal authenticates the trigger message according to the authentication type.

After the configuration is completed, when initiating the management session, the terminal can determine, according to the session protocol version information mapped onto the DMAcc on the DMT and the protocol version supported by the terminal, a session protocol version suitable for the terminal and the server, and initiate a session request message according to the session protocol version.

In this embodiment, a protocol version corresponding to a configuration file can be identified according to protocol version information supported by or corresponding to a corresponding server and carried in the configuration file, so that the terminal can determine a protocol that should be used for communication with the server, so as to perform a correct configuration, thus eliminating the problem of increased communication traffic due to different protocol versions.

Figure 2:
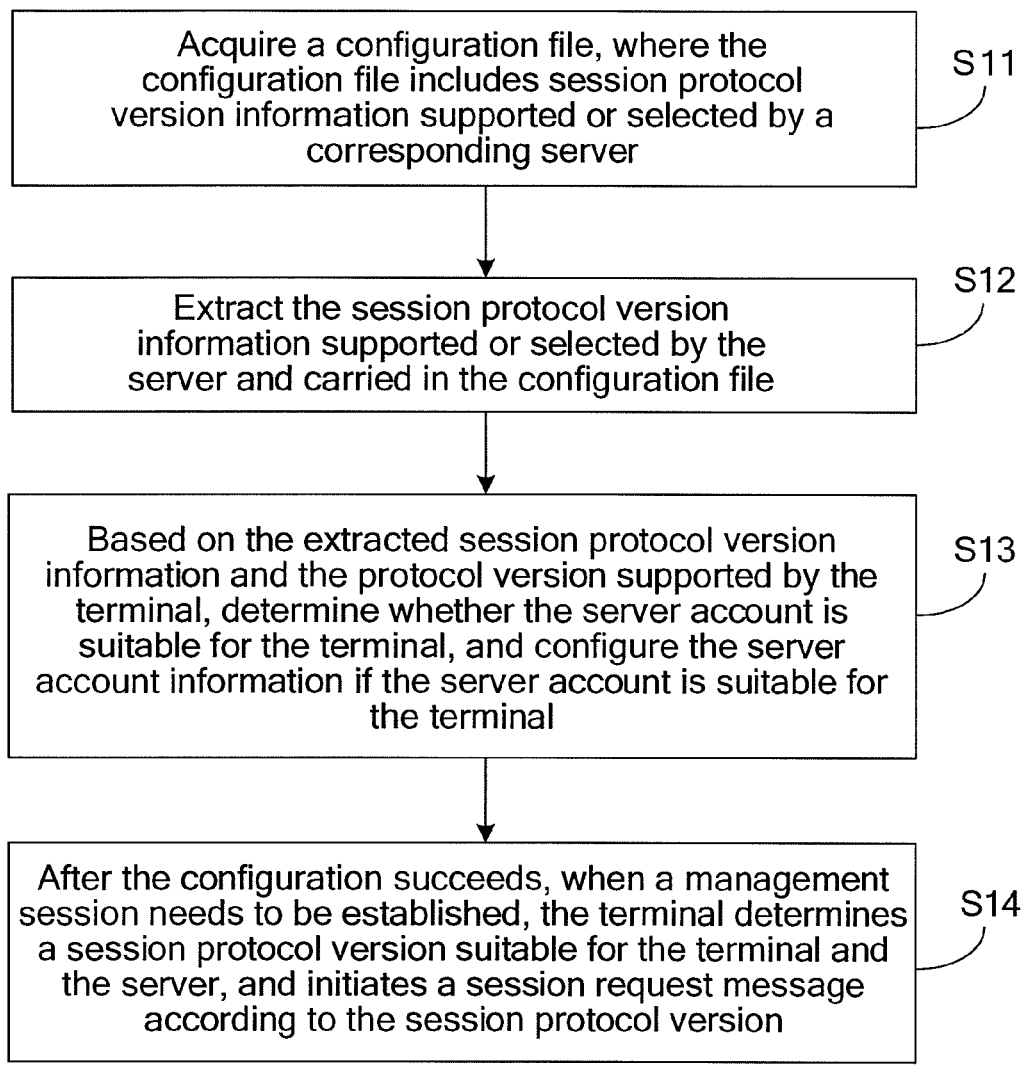
FIG. 2 is a schematic diagram showing a flowchart of terminal configuration according to an embodiment of the present invention.

Referring to FIG. 2, a method for configuration and management according to a second embodiment includes the following steps.

In step S11, a configuration file is acquired, where the configuration file carries one or more pieces of server account information, and at the same time carries session protocol version information supported or selected by a server corresponding to each of the account information. Furthermore, the session protocol version information is carried in the corresponding server account information, and the session protocol version information is one or more protocol version values.

The acquiring method includes the following: a terminal device reads the configuration file built in a Subscriber Identity Module (SIM)/Universal Subscriber Identity Module (USIM) card, or the terminal device acquires the configuration file from an external entity through a local interface (such as Bluetooth, Infrared, and USB), or a network side pushes the configuration file to the terminal device in a Push mode, or the terminal device requests for the configuration file from the network side in a PULL mode.

The method for requesting for the configuration file in the PULL mode includes the following steps.

1) The terminal acquires an address of the configuration file. The address information may, but is not limited to, be stored in a SIM/USIM card in advance by a SIM/USIM card issuer. When the address is acquired, security encryption information may also be acquired, where the security encryption information is for the terminal to perform content integrity and confidentiality authentication subsequently on the received configuration file, and may be a certificate of the server.

2) The terminal acquires the configuration file according to the address, which is specifically as follows.

If the address is a Universal Resource Locator (URL) of the configuration file, the terminal directly downloads the configuration file, for example, by using a HyperText Transfer Protocol (HTTP).

If the address is a request address (that is, an access address of the server, where through the access address the configuration file is requested from the server), the terminal sends, to the request address, a request message for acquiring the configuration file, where the request message may be an HTTP message, and may carry one or more of the following: an identifier of the terminal (such as, International Mobile Equipment Identity (IMEI) and Electronic Serial Number (ESN)), service subscriber information (such as user public identifier), a subscriber identity authentication code (information allocated by the network side to the subscriber to identify the identity of the subscriber, for example, an identity authentication code, after being requested by the user through the public identifier, delivered by the network side to the terminal through Short Message Service (SMS) or other means), device information (such as, device type, operating system version, firmware version), and a supported DM version. After receiving the request message, the server identifies the identity of the terminal according to the carried information and selects a configuration file suitable for the terminal, where the configuration file is organized in the format of Client Provisioning Profile or Management Object Profile, and delivers the configuration file to the terminal after performing integrity and confidentiality processing on the configuration file.

In the above method, the server identifies the identity of the terminal according to the subscriber identity authentication code and the service subscriber information; and the server selects the configuration file suitable for the terminal according to the identifier of the terminal, the device information, the service subscriber information, or the supported DM version.

The PULL method may be used to acquire any configuration file for OMA DM initial configuration.

With the PULL method, the corresponding configuration file on the server can be directly updated after the server is upgraded or after it is found that the configured information is erroneous, so that the configuration file delivered to the terminal is the latest, thus eliminating the cost of notifying the terminal and redelivering a new configuration file when the server configures the configuration file to the terminal in advance and it is found that the account information is erroneous or the server is upgraded.

In step S12, the session protocol version information supported or selected by the server and carried in the configuration file is extracted.

In step S13, based on the extracted session protocol version information and the protocol version supported by the terminal itself, it is judged whether the server account is suitable for the terminal, and the server account information is configured if the server account is suitable for the terminal.

Furthermore, the judging whether the server account is suitable for the terminal includes the following step.

It is determined whether the protocol version supported by the terminal is corresponding to the extracted session protocol version (if both parties support multiple versions, it is determined whether the supported version sets have an intersection). If the protocol version supported by the terminal is not corresponding to the extracted session protocol version, it is determined that the account is not suitable for the terminal, and if other account information exists, a suitable server account is searched for continuously; if no other account information exists, the configuration process ends. If the protocol version supported by the terminal is corresponding to the extracted session protocol version, it is determined that the server account corresponding to the element is suitable for the terminal. If the same server in the same configuration file has multiple server accounts suitable for the terminal, a server account supporting the latest protocol version is selected for configuration.

Specifically, the configuration may include the following steps.

A position on a DMT is determined, the account information in the configuration file is mapped to be a DMAcc Management Object instance in the position, and one or more protocol version values carried in the account information are mapped to be a value or a field of a value of one or more leaf nodes of the DMAcc Management Object instance. If other related management objects (for example, connection parameter management objects) exist, the related management objects are also mapped onto the DMT. Get, Replace, Delete rights of the mapped management object nodes are granted to the server corresponding to the server account.

In step S14, after the configuration succeeds, when a management session needs to be established, the terminal determines, according to the session protocol version information mapped onto the DMAcc on the DMT and the protocol version supported by the terminal, a session protocol version suitable for the terminal and the server, and initiates a session request message according to the session protocol version.

The step of determining the session protocol version suitable for the terminal and the server may be: determining an intersection of the protocol version set supported by the terminal and the session protocol version set on the DMAcc, if the intersection includes only one protocol version, determining to initiate the session with this protocol version, and if the intersection includes multiple protocol versions, the latest version is selected to initiate the session. The server uses the same protocol version in response, and subsequently uses the protocol for interaction. If the server wants to use a protocol of another version for session, negotiation may be performed in subsequent sessions.

With the method for carrying the session protocol version information supported or selected by the server in the server account information according to embodiments of the present invention, before the server account is configured to the terminal, the terminal can determine whether the server is suitable for the terminal in advance, thus avoiding configuring a server account not suitable for the terminal and reducing subsequent processing cost, and meanwhile, the protocol version supported by the server also enables the terminal to determine a suitable session protocol version before initiating the session, thus reducing the cost of subsequent negotiation about the session protocol version.

After the account information of the server is configured, a management session between the server and the terminal may be established. The initiation of the management session may be actively triggered by the terminal, or triggered by the server. If the management session is actively triggered by the terminal, the terminal is directly connected to the server and sends a request message to request a session, where the request message may be implemented based on a protocol such as HTTP, Wireless Session Protocol (WSP), Object Exchange (OBEX), or Session Initiation Protocol (SIP). If the management session is triggered by the server, as the server can hardly be directly connected to the terminal, a commonly used method is that the server delivers and sends a session trigger message to the terminal through SMS, Wireless Application Protocol Push (WAP Push), or SIP Push, where the trigger message carries information such as the server identity authentication information, the server identifier, the session identifier, and the session initiator, and the terminal initiates a session request according to the trigger message to establish the management session with the server. The configured server account information may have multiple pieces of authentication information corresponding to different authentication types. The authentication types include, for example, syncml:auth-basic, and syncml:auth-md5, and the terminal adopts one authentication type to generate the authentication information, and the adopted authentication type may be a preferred authentication type designated in the configured account. If no preferred authentication type is designated in the configured server account, the authentication type negotiated by the last session may be used. If the server considers that the authentication type adopted by the terminal is not suitable, the server may send a Challenge to the terminal to designate a new authentication type.

The session trigger message sent by the server includes a digest and a trigger message (trigger), where the digest is an MD5 digest, and the generation method is as follows.

$$\text{Digest}=H(B64(H(\text{server-identifier}:\text{password})):\text{nonce}:B64(H(\text{trigger})))$$

Here, H is an MD5 Hash function, server-identifier is a server identifier, nonce is an anti-replay-attack random number, B64 is a Base64 coding function, and password is an authentication password.

Since the terminal may have multiple pieces of authentication information, and the server and the terminal have no negotiation mechanism, the server and the terminal can hardly use the password and nonce of the same authentication information to process the trigger message during interconnection, thus increasing the difficulty for the terminal to process. Meanwhile, since a random number must be used in the trigger message in order to prevent replay attacks, authentication information having a nonce needs to be maintained for the trigger message. After the parameters are configured, the trigger message may be processed by using the following methods.

Method 1: Authentication information (corresponding to a certain authentication type) determined for the trigger message is designated (including standardized) in advance. The authentication information must have a password and a random number, and may not have a user name, and authentication information corresponding to the authentication type syncml:auth-md5 or syncml:auth-MAC may be used. If the terminal and the server support the trigger message to trigger the management session, the authentication information must exist in the account information of the server configured by the terminal, that is, an AppAuth node of a DMAcc instance corresponding to the server account on the DMT must have the authentication information with an AAuthType value of the authentication type.

Based on the authentication information designated in advance, the server generates a trigger message and delivers the trigger message to the terminal through other channels not for the DM session. The terminal extracts the server identifier in the trigger message, and then reads the password and the random number of the determined authentication information in the DMAcc Management Object instance corresponding to the server identifier configured on the DMT, uses the server identifier, the password, and the random number to generate an MD5 digest to authenticate the validity and integrity of the trigger message (the generation algorithm is the same as the DIGEST generation algorithm described above), and initiates a session request to the server after the authentication succeeds. If the application layer authentication needs to be used, a preferred authentication type in the server account information is used in the session request to generate the authentication information. If no preferred authentication type exists in the account information, the session type successfully used in the last session is used to perform the authentication.

Method 2: The trigger message format is extended to add an authentication type or authentication name field. The authentication type field value is corresponding to the AAuthType node value under the AppAuth node on the DMAcc Management Object, and the authentication name field value is corresponding to the AAuthName node value under the AppAuth node on the DMAcc Management Object. The field may be extended at a message header (trigger-hdr) or a message body (trigger-body) of the trigger message. As the authentication type value is long, it can be coded, and the field extended by the trigger message carries the code only, and may also directly carry the authentication type value. Based on the extension, the server carries the authentication type or the authentication name used by the server in the trigger message delivered to the terminal. In order to support the extension, the server account information configured by the terminal must include the authentication information corresponding to the authentication type or the authentication name used by the trigger message.

Based on the authentication type or authentication name field carried in the trigger message, after receiving the trigger message sent by the server through other channels not for the DM session, the terminal extracts the server identifier and the authentication type or authentication name information in the trigger message, and then reads the password and the random number of the authentication information corresponding to the authentication type or the authentication name in the DMAcc Management Object instance corresponding to the server identifier configured on the DMT, uses the server identifier, the password, and the random number to generate an MD5 digest to authenticate the validity and integrity of the trigger message (the generation algorithm is the same as the DIGEST generation algorithm described above, and the authentication name may also be used to replace the server identifier in the DIGEST generation algorithm while keeping other elements in the algorithm unchanged), and initiates a session request to the server after the authentication succeeds. If the application layer authentication needs to be used, a preferred authentication type in the server account information is used in the session request to generate the authentication information. If no preferred authentication type exists in the account information, the session type successfully used in the last session is used to perform the authentication.

Method 3: The specific type of the authentication information used by the server and the terminal is not limited, but the server account information configured by the terminal must include at least one authentication type having a nonce. At the same time, a determination rule is predetermined (including standardized), and the terminal and the server select an authentication type for the session trigger message according to the determination rule. As both the server and the terminal know the authentication type included in the server account information, the two can be enabled to select the same authentication type based on the authentication type determination rule. The authentication type determination rule may be: sequencing the authentication types having a nonce (for example, according to priorities), and selecting an authentication type according to the sequence.

Based on the predetermined determination rule, the server determines a suitable authentication type from the authentication types of the server account information configured to the terminal to generate a trigger message, and delivers the trigger message through other channels not for the DM session. For example, if the determination rule is "selecting syncml:auth-md5 and syncml:auth-MAC in sequence", the server account must include one of the two authentication types, and in operation, the server determines the authentication type according to the following method: if the server account information includes the authentication information of the authentication type of syncml:auth-md5, the authentication type is determined to be the authentication type for the session trigger message; if the server account information does not include the authentication information of the authentication type of syncml:auth-md5, syncml:auth-MAC is determined to be the authentication type for the session trigger message.

The terminal extracts the server identifier in the trigger message, and then determines, based on the same determination rule, an authentication type from the DMAcc Management Object instance corresponding to the server identifier configured on the DMT, reads the password and the random number of the authentication type, uses the server identifier, the password, and the random number to generate an MD5 digest to authenticate the validity and integrity of the trigger message (the generation algorithm is the same as the DIGEST generation algorithm described above), and initiates a session request to the server after the authentication succeeds. If the application layer authentication needs to be used, a preferred authentication type in the server account information is used in the session request to generate the authentication information. If no preferred authentication type exists in the account information, the session type successfully used in the last session is used to perform the authentication.

Method 4: The type of the authentication information used by the server and the terminal is not limited, but the server account information configured by the terminal must include at least one authentication type having a nonce.

Based on the unlimited authentication information, the server selects an authentication type having a nonce to generate a trigger message, and delivers the trigger message to the terminal through other channels not for the DM session.

The terminal extracts the server identifier in the trigger message, and then reads the password and the random number of a certain authentication type having a nonce from the DMAcc Management Object instance corresponding to the server identifier configured on the DMT, and uses the server identifier, the password, and the random number to generate an MD5 digest to authenticate the validity and integrity of the trigger message (the generation algorithm is the same as the DIGEST generation algorithm described above). If the authentication fails, another authentication type having a nonce is selected to re-authenticate the trigger message, till the authentication succeeds or all the authentication types having a nonce have been tried. After the authentication succeeds, a session request is initiated to the server. If the application layer authentication needs to be used, a preferred authentication type in the server account information is used in the session request to generate the authentication information. If no preferred authentication type exists in the account information, the session type successfully used in the last session is used to perform the authentication.

In the method for processing the trigger message, the configured server account information may carry or not carry the session protocol version information supported or selected by the server. The method may also be used for trigger message processing after server account configuration of OMA Data Synchronization (DS).

Through the method for processing the trigger message, the server and the terminal are enabled to use the same authentication information to process the trigger message during interconnection, thus reducing the difficulty for terminal to process, and at the same time, it is ensured that the client and the server supporting the trigger message can always select authentication information having a random number, thus realizing the function of the anti-replay-attack mechanism of the trigger message.

Figure 3:
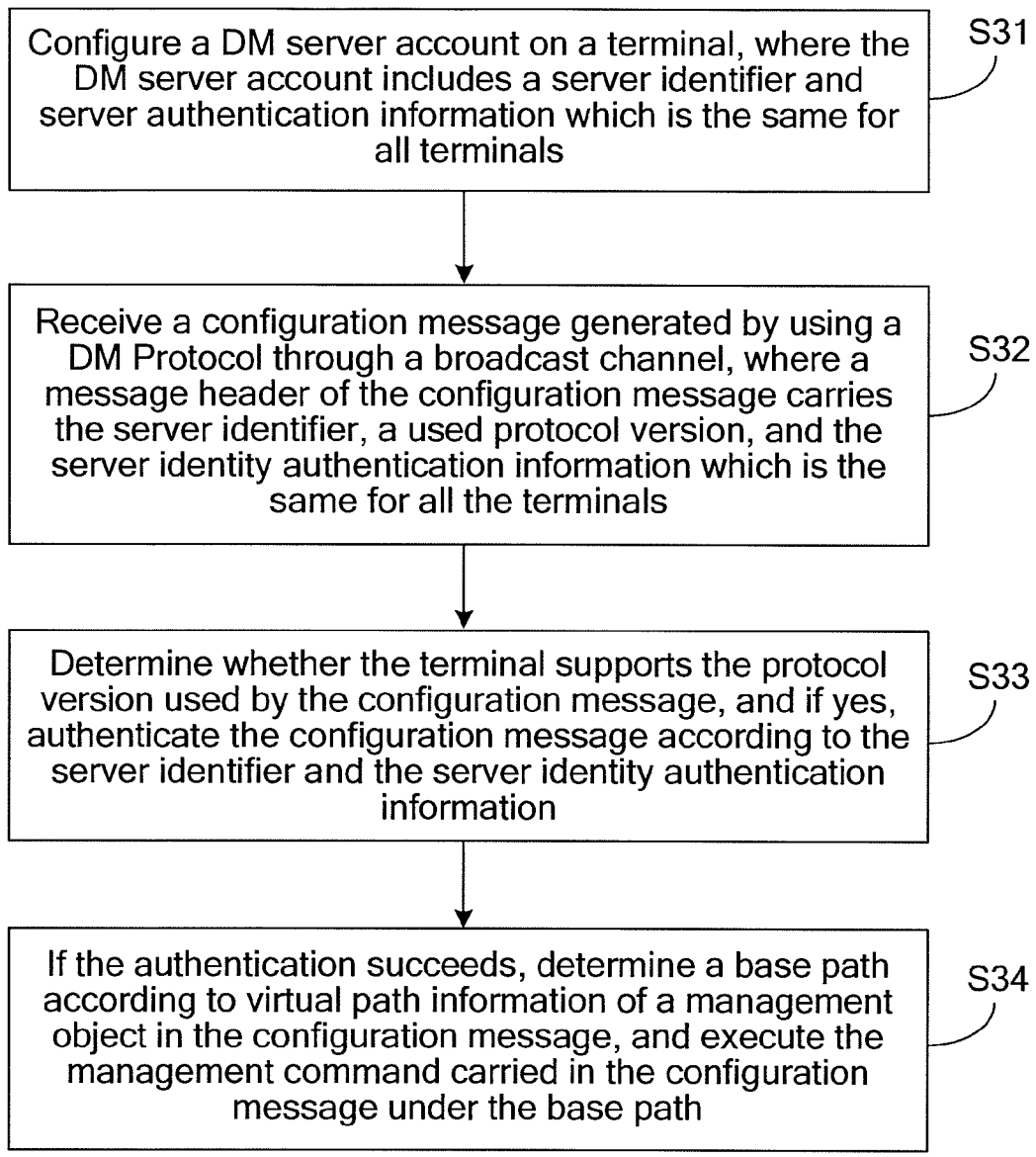
FIG. 3 is a schematic diagram showing a flowchart of terminal configuration according to another embodiment of the present invention.

A terminal configuration method according to a third embodiment of the present invention is for achieving batch configuration and management based on account configuration. As shown in FIG. 3, the method includes the following steps.

In step S31, a DM server account is configured on a terminal, where the DM server account includes a server identifier and authentication information of a server, where the authentication information is the same for all terminals.

In step S32, a configuration message (for parameter configuration or management) generated by using a DM Protocol is received through a broadcast channel, where a message header of the configuration message carries the server identifier, a used protocol version, and the server identity authentication information which is the same for all the terminals.

In step S33, it is determined whether the terminal supports the protocol version used by the configuration message, and if the terminal supports the protocol version used by the configuration message, the configuration message is authenticated according to the server identifier and the server identity authentication information.

In step S34, if the authentication succeeds, a basic path (that is, a basic path on a DMT of the terminal) is determined according to virtual path information (that is, virtual path information on the DMT of the terminal) of a management object in the configuration message, and the determined path must satisfy the following condition: The server corresponding to the carried server identifier has the right of executing a management command in the configuration message under the node of the DMT of the terminal, and the management command carried in the configuration message is executed under the basic path.

As for the server, some configuration tasks or management tasks do not need to distinguish the terminals, for example, for configuration of connection parameters, the same parameter values are configured for all the terminals. The configuration of the connection parameters may be performed for multiple terminals at the same time, and the demand for interaction is not intense. For such tasks, in order to reduce the occupation of the channel and lighten the load of the server, a broadcast/multicast mode may be adopted.

Figure 4:
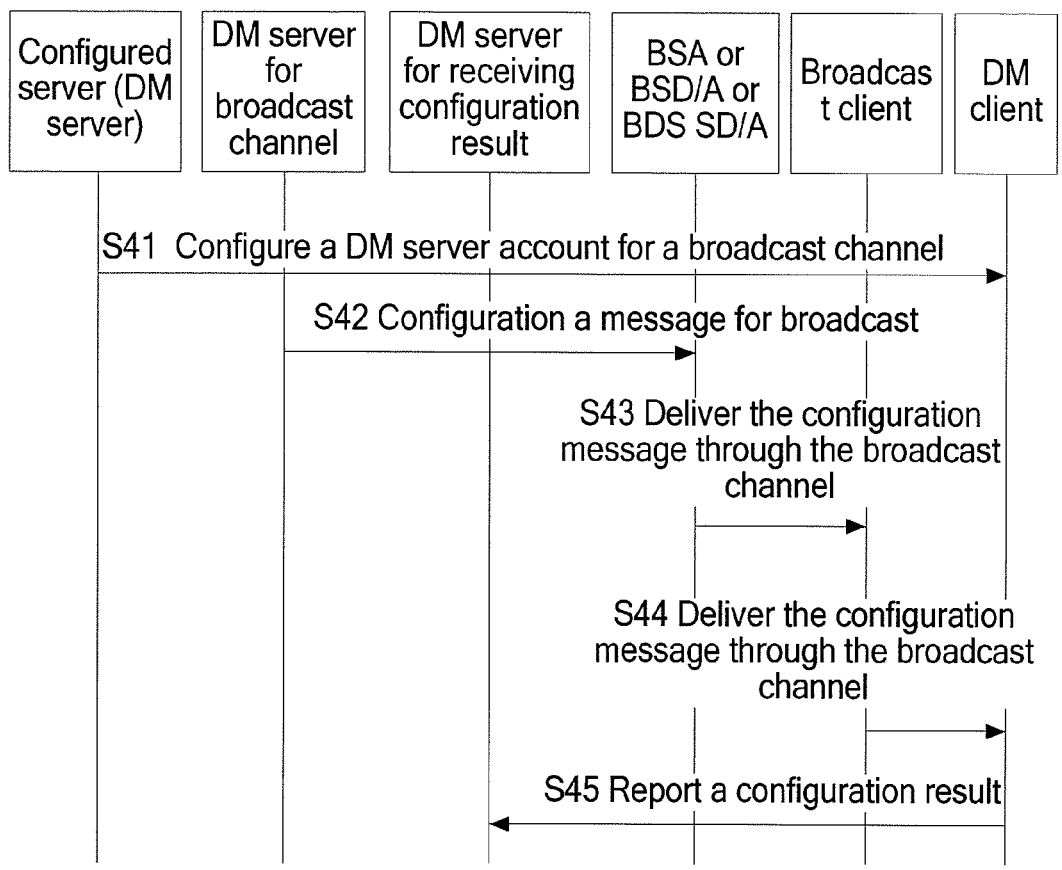
FIG. 4 is a schematic diagram showing a flowchart of terminal configuration in a broadcast mode according to an embodiment of the present invention.

A configuration method based on the broadcast mode (similar to the multicast mode, and similar to the delivery of other batch management tasks) according to a fourth embodiment is described in the following with reference to FIG. 4.

In step S41, an account of a DM server for management through a broadcast channel is configured on a DMT of a terminal, where the DM server is responsible for generating a DM message (that is, a configuration message based on a DM Protocol) for configuration through the broadcast channel. The account includes a server identifier and authentication information of the server, where the authentication information is the same for all terminals, and a certificate of the DM server may be used to complete unidirectional authentication (that is, the terminal authenticates the DM server). The account may further include a reporting address or reporting server identifier of a management message delivered through the broadcast channel, for the terminal to report a processing result of the DM message received through the broadcast channel. The configuration of the DM server account may be completed in the following manners.

In step S41a), the configuration of the DM server account is completed during initial configuration, and the account information is carried in an initial configuration file acquired by the terminal, and is mapped onto a DMT of the terminal during configuration.

In step S41b), a DM session with the terminal is established through another DM server, and the account of the server is added to the DMT during the session.

In step S42, after the configuration is completed, the configured server generates a configuration message based on the DM protocol for broadcast, where the configuration message carries the server identifier, a used protocol version, the server identity authentication information, a DM management command, and a target configuration value. The server identifier is carried in a <Source>/<LocName> element of the message header, and the identifier is used by the terminal to authenticate the server, and is further used by the terminal to judge an access control right (that is, Access Control List (ACL)) of the server to a target management node on the DMT. The target configuration value may be a management object (consisting of one or more management nodes), and the method for carrying the target configuration value in the configuration message specifically includes: sequencing the management object, providing a virtual path "./Inbox" to the sequenced management object, where the relative path is corresponding to a management object with an identifier of urn:oma:mo:oma-dm-inbox:1.0 on the DMT of the terminal. The virtual path instructs the terminal to determine a basic path of practical significance (that is, a basic path on the DMT) according to the situation of the DMT, and to execute the DM management command on the configuration value based on the basic path and the ACL. Herein, the DM management command is an Add or Replace command. An instance of the message is given as follows.

```
<SyncML xmlns='SYNCML:SYNCML1.2'>
  <SyncHdr>
    <VerDTD>1.2</VerDTD>
    <VerProto>DM/1.2</VerProto>
    <Target><LocURI>IMEI:493005100592800</LocURI></Target>
    <Source>
      <LocURI>http://www.syncml.org/mgmt-server</LocURI>
      <LocName><!--server identifier, for the terminal to identify
      the server for authentication, and at the same time to judge
      the ACL right --></LocName>
    </Source>
    <Cred>
      <Meta><Type xmlns="syncml:metinf"><!     -- authentication
      type
      --></Type>
        <Format     xmlns='syncml:metinf'><!-- authentication
        information format --></Format></Meta>
      <Data><!-- authentication information value --></Data>
    </Cred>
  </SyncHdr>
```

-continued

```
<SyncBody>
    <Add>
        <CmdID>1</CmdID><!-- for the terminal to return a state
-->
        <Item>
            <Target> <LocURI>./Inbox</LocURI> </Target>
            <Meta>
                <Format xmlns='syncml:metinf'>xml</Format>
                <Type
xmlns='syncml:metinf'>application/vnd.syncml.dmtnds+xml</Type>
            </Meta>
            <Data>
                <MgmtTree xmlns='syncml:dmddf1.2'>
                    <VerDTD>1.2</VerDTD>
                    <Node>
                        <NodeName>MMS</NodeName>
                        <RTProperties >
                            <Format><node/></Format>
                            <Type>      <DDFName><!     -- MOID
--></DDFName></Type>
                        </RTProperties>
                        <Node><!-- subnode contents --></Node>
                    </Node>
                </MgmtTree>
            </Data>
        </Item>
    <Add>
</SyncBody>
</SyncML>
```

The server sends the generated configuration message and the type of the message (DM message type is: application/vnd.syncml.dm+xml) to a BCAST Service Application (BSA), a BCAST Service Distribution/Adaptation (BSD/A), or a Broadcast Distribution System Service Distribution/Adaptation (BDS SD/A).

In step S43, the BSA, the BSD/A, or the BDS SD/A encrypts contents and sends the configuration message and the type of the configuration message to a broadcast client through a broadcast network.

In step S44, after receiving the configuration message, the broadcast client decrypts contents of the configuration message, and then determines, according to the type of the configuration message, a client to which the configuration message is to be delivered, and delivers the configuration message to a DM client.

The DM client processes the configuration message, and the specific processing method is as follows.

In step S44 a), it is judged whether the terminal supports the protocol version used by the configuration message, and if the terminal supports the protocol version used by the configuration message, the next step is performed.

In step S44 b), the server identifier and the authentication type in the message are extracted, and then the configuration message is authenticated by using the authentication information of the authentication type in the account corresponding to the server identifier configured by the terminal, which is specifically as follows: The terminal extracts the authentication information on the corresponding DMAcc Management Object from the DMT of the terminal according to the server identifier and the authentication type, uses the authentication information to generate authentication data, and compares whether the authentication data is the same as the server identity authentication information carried in the configuration message, and if the authentication data is the same as the server identity authentication information carried in the configuration message, the authentication succeeds; if the authentication data is different from the server identity authentication information carried in the configuration message, the authentication fails. After the authentication succeeds, the next step is performed.

In step S44 c), the terminal learns, according to the "./Inbox" in the configuration message, that the terminal needs to determine a basic path on the DMT, and determines a suitable basic path on the DMT, where the basic path must satisfy the following condition: The DM server has the right of executing the management command in the configuration message under the basic path. A method for judging whether the DM server has the right of executing the management command in the configuration message under the basic path is: determining according to the server identifier carried in the configuration message, the management command carried in the configuration message, and the ACL of the DMT management node corresponding to the determined basic path, and if the ACL includes the management command item and the item includes the server identifier, it indicates that the DM server has the right.

In step S44 d), the management command in the configuration message is executed under the basic path.

The execution process is specifically as follows: If the management command carried in the configuration message is Add, the sequenced management object is added under the determined basic path of the DMT (for configuring a new parameter value). If a management node already exists under the complete path, it is judged whether the same parameter is used, and if the same parameter is used, the Add operation fails; if different parameters are used, the management object root node to be configured is renamed, and the management object is added after being renamed. If the management command carried in the configuration message is Replace, the sequenced management object carried in the configuration message is used to update the existing management object under the determined basic path of the DMT (for updating the existing parameter value). If no management node exits under the basic path, the Replace operation fails.

After the configuration, the method further includes a step of activating the configured parameter.

In step S45 (which is optional), after the management command in the configuration message is executed (succeeds or fails), the client acquires the reporting address or the reporting server identifier included in the configured server account. If the reporting address is acquired, an HTTP message or other corresponding message is generated and sent to the reporting address. If the reporting server identifier is acquired, the terminal establishes a DM management session with the server corresponding to the server identifier, and reports an execution result during the DM management session, where the reported execution result includes, for example, having no right, incompatible version, and successful execution.

During the configuration, the configuration not requiring to distinguish the terminals may be effectively completed by using the DM mechanism, which can not only ensure the security (server identify authentication and access right control), but also satisfy the requirements of management object location of different DMT structures and configuration result reporting, so that batch parameter configuration based on the DM can be completed securely and effectively, thus improving the operation efficiency, reducing the occupation of the channel, and lightening the load of the server.

Figure 5:
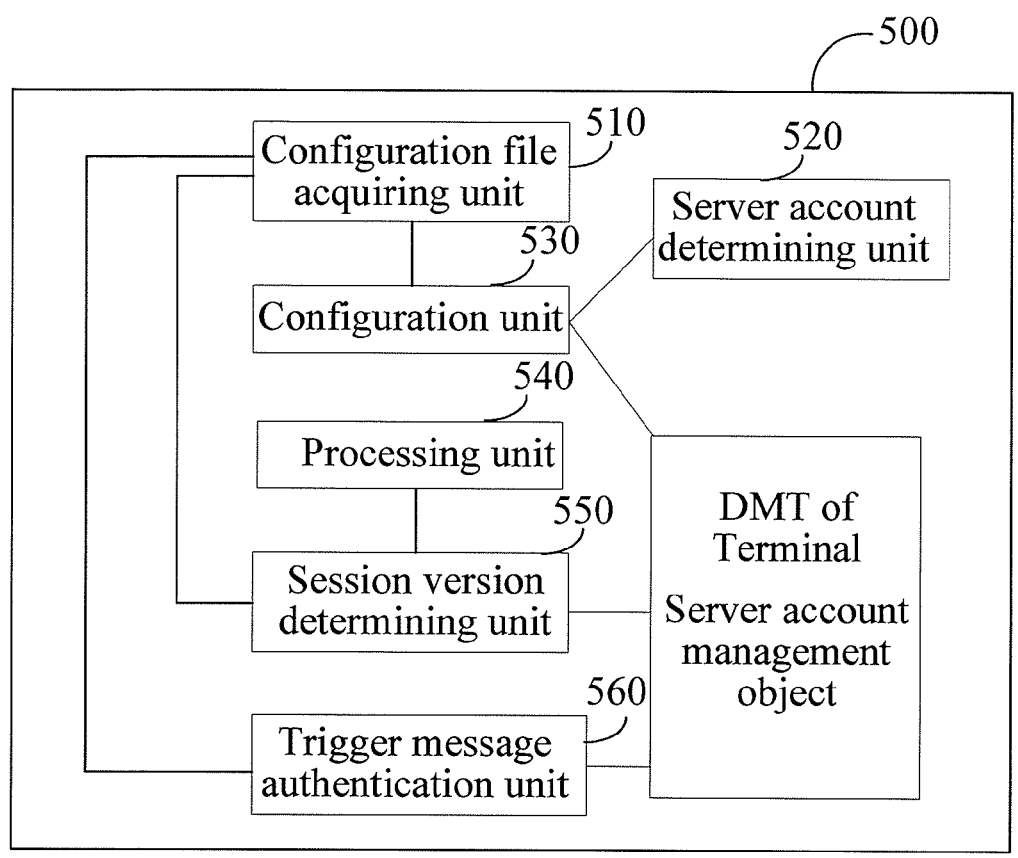
FIG. 5 is a schematic structural view of a terminal according to an embodiment of the present invention.

Referring to FIG. 5, a terminal 500 according to an embodiment of the present invention includes: a configuration file acquiring unit 510, a server account determining unit 520, a configuration unit 530, a processing unit 540, a session version determining unit 550, and a trigger message authentication unit 560.

The configuration file acquiring unit 510 is adapted to acquire a configuration file. The acquiring unit includes a PULL unit for acquiring the configuration file in a PULL mode. When acquiring the configuration file, the PULL unit sends, to an acquisition server, an acquisition request carrying terminal information. The configuration file may further carry server account information, and the server account information includes session protocol version information supported by a corresponding server.

The server account determining unit 520 is adapted to extract the session protocol version information, and determine whether the server account is suitable for the terminal based on the session protocol version information and a protocol version supported by the terminal.

The configuration unit 530 is adapted to configure the determined server account information onto a DMT of the terminal when it is determined that the server account is suitable for the terminal.

The processing unit 540 is adapted to establish, based on the configured server account, a management session between the terminal and the server, and perform subsequent configuration and management on the terminal during the session.

The session version determining unit 550 is adapted to, when the management session is initiated, determine, according to the session protocol version information mapped onto a DMAcc on the DMT and the protocol version supported by the terminal, a session protocol version suitable for the terminal and the server; and the processing unit 540 initiates a session request message according to the session protocol version.

The trigger message authentication unit 560 is adapted to authenticate a trigger message by using an authentication type designated in advance, an authentication type or an authentication name carried in the trigger message, or an authentication type determined according to a predetermined rule, where authentication information corresponding to the authentication type or the authentication name is included in the configured account information.

To conclude, in the technical solutions of the present invention, when performing initial configuration, the terminal can identify, according to protocol version information supported by or corresponding to a corresponding server and carried in the configuration packet, a protocol version corresponding to a configuration packet, so that the terminal can determine whether the packet is suitable for the terminal, so as to perform a correct configuration. When the terminal is capable of supporting a plurality of protocol versions, the terminal can determine, according to the protocol version information supported by or corresponding to the corresponding server and carried in the configuration packet, a protocol that should be used for communication with the server, thus eliminating the problem of increasing communication traffic due to different protocol versions.

Figure 6:
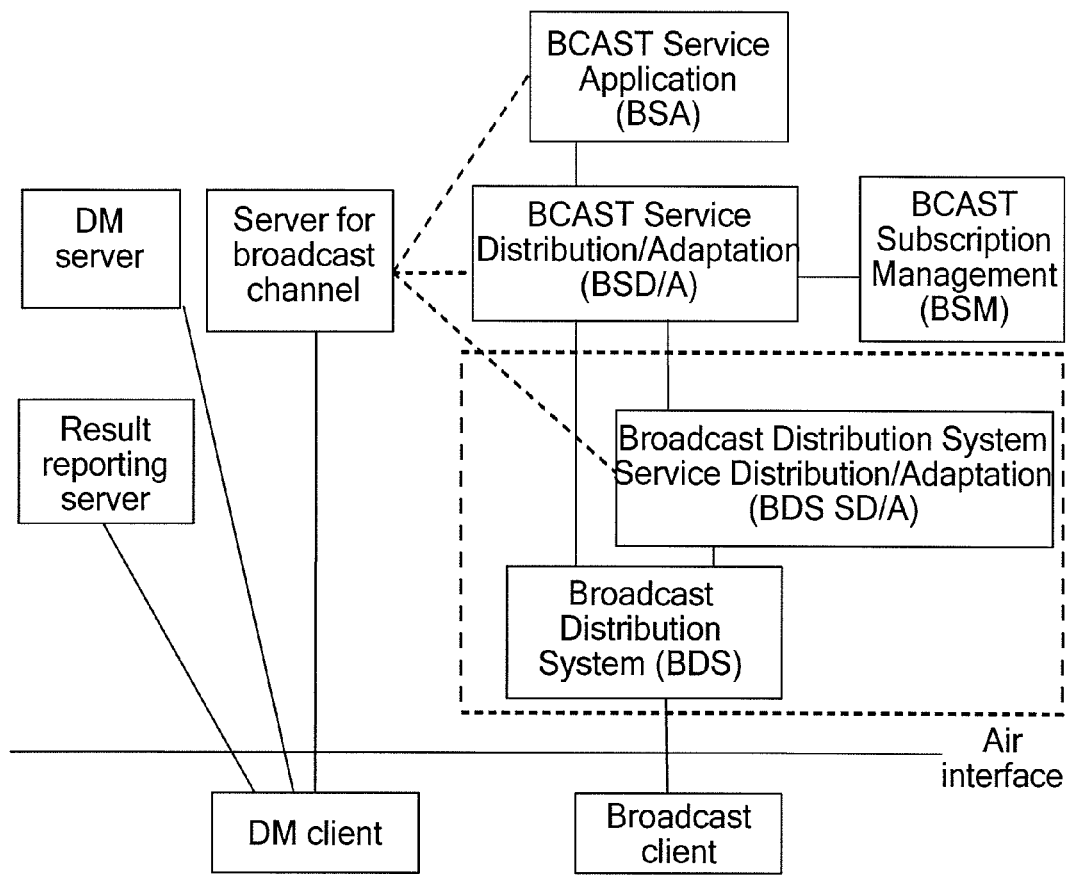
FIG. 6 is a schematic structural view of a parameter-configuration system according to an embodiment of the present invention.

Referring to FIG. 6, a system for batch configuration according to an embodiment of the present invention includes a DM server, a broadcast client, and a DM client.

The DM server is adapted to generate a configuration message based on a DM protocol to be delivered through a broadcast channel, where the configuration message carries a DM server identifier and authentication information. The DM server is connected to a BSA or BSD/A or BDS SD/A to deliver the configuration message, and the delivery channel is a broadcast channel.

The broadcast client is adapted to receive a message delivered through the broadcast channel, identify the message according to type of the message, and forward the message to the DM client.

The DM client is adapted to, according to the server identifier and an authentication type that are carried in the configuration message, complete identity authentication of the DM server generating the configuration message, determine, according to the DM server identifier, an access control right of the DM server to a target management node on a DMT of a terminal, determine a suitable basic path on the DMT based on the access control right, where the determined path must satisfy the following condition: The server corresponding to the carried server identifier has the right of executing a management command in the configuration message under the node, and execute the management command carried in the configuration message under the basic path.

Through the batch configuration method, secure delivery of batch general management operations such as parameter configuration can be effectively completed, thus improving the operation efficiency, reducing the occupation of the channel, and lightening the load of the server.

Obviously, persons of ordinary skill in the art should understand that, the units or steps in the present invention may be realized with a universal computing device, and they can be integrated on a single computing device, or distributed on a network consisting of a plurality computing devices. Optionally, the units or steps may be realized by using an executable program code of the computing device, thus the units or steps are stored in a storage device and executed by the computing device, or they are realized by being fabricated into integrated circuit (IC) modules respectively or fabricating multiple units or steps among them into a single IC module. Thus, the present invention is not limited to any specific combination of hardware and software.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, while such modifications or replacements do not depart from the scope of the technical solution according to embodiments of the present invention.

What is claimed is:

1. A method for terminal configuration and management, the method comprising:
   configuring a Device Management (DM) server account on a terminal, wherein the DM server account comprises an identifier of a DM server and authentication information for the DM server, wherein the authentication information for the DM server is used for authenticating the DM server in a unidirectional way;
   generating, by the DM server based on a DM Protocol, a configuration message including the identifier of the DM server, the authentication information for the DM server, a DM management command, and a target configuration value corresponding to a management object comprising a management node, and
   wherein the target configuration value is generated by:
   sequencing the management object and providing a virtual path to the sequenced management object, wherein the virtual path corresponds to the management object on a Device Management Tree (DMT) on the terminal, and wherein the virtual path is operable to instruct the terminal to determine a basic path on the DMT and to execute the DM management command on the management node corresponding to the target configuration value;

receiving, by the terminal through a broadcast channel, the configuration message generated by the DM server, wherein the configuration message is used for parameter configuration or management;

extracting, by the terminal, the authentication information for the DM server from the DM server account according to the identifier of the DM server, and authenticating the received configuration message by using the authentication information; and if the authentication succeeds, determining, by the terminal, according to the identifier of the DM server, an access control right of the DM server to the management node corresponding to the target configuration value in the received configuration message, and executing, by the terminal, based on the access control right, the DM management command carried in the received configuration message.

2. The method according to claim 1, wherein the configuration message further comprises a used protocol version, and the method further comprises:

determining, by the terminal according to the used protocol version information carried in the configuration message, whether the terminal supports the configuration message, and if the terminal supports the configuration message, authenticating the configuration message.

3. A system for terminal configuration and management, the system comprising:

a Device Management (DM) server, configured to generate a configuration message based on a DM Protocol, wherein the configuration message includes an identifier of the DM server, authentication information for the DM server, a DM management command, and a target configuration message corresponding to a management object comprising a management node, and wherein the authentication information for the DM server is used for authenticating the DM server in a unidirectional way, and wherein the target configuration value is generated by sequencing the management object and providing a virtual path to the sequenced management object, wherein the virtual path corresponds to the management object on the Device Management Tree (DMT) on a terminal, and wherein the virtual path is operable to instruct the terminal to determine a basic path on the DMT and to execute the DM management command on the management node corresponding to the target configuration value;

a broadcast client, configured to receive the configuration message delivered through a broadcast channel, identify the received configuration message according to a type of configuration message, and forward the received configuration message to a DM client of the terminal; and the DM client of the terminal, configured to authenticate the DM server according to the identifier of the DM server carried in the configuration message by using the authentication information, determine, according to the identifier of the DM server, an access control right of the DM server to the management node corresponding to the target configuration value in the configuration message, and execute, based on the access control right, the DM management command carried in the configuration message.

4. A method for terminal configuration and management, the method comprising:

receiving, by a terminal through a broadcast channel, a configuration message generated by a Device Management (DM) server, wherein the configuration message includes an identifier of the DM server, an authentication information for the DM server, a management command and a target configuration value;

extracting, by the terminal, the authentication information from an account for the DM server according to the identifier of the DM server;

authenticating the received configuration message by using the extracted authentication information;

if the authentication succeeds, determining, by the terminal, according to the identifier of the DM server, an access control right of the DM server to a management node corresponding to the target configuration value in the received configuration message, and execute, based on the access control right, the management command carried in the received configuration message;

wherein the terminal has been configured with the account for the DM server, and the account for the DM server comprises the identifier of the DM server, the authentication information for the DM server; and wherein the terminal uses the received configuration message for parameter configuration or management corresponding to a management object, wherein the management object is sequenced by the DM server, and a virtual path to the sequenced management object is provided, wherein the virtual path corresponds to the management object on a Device Management Tree (DMT) on the terminal and is used to instruct the terminal to determine a basic path on the DMT and execute the management command.

5. A terminal, comprising a tangible non-transient computer-readable medium and a processor for executing instructions stored on the computer-readable medium, the computer-readable medium comprises computer-executable instructions that, when executed, cause the processor to:

receive, through a broadcast channel, a configuration message generated by a Device Management (DM) server, wherein the received configuration message includes an identifier of the DM server, an authentication information for the DM server, a management command and a target configuration value;

extract the authentication information from an account for the DM server according to the identifier of the DM server;

authenticate the received configuration message by using the extracted authentication information;

if the authentication succeeds, determine according to the identifier of the DM server, an access control right of the DM server to a management node corresponding to the target configuration value in the received configuration message, and executing, by the terminal, based on the access control right, the management command carried in the received configuration message;

wherein the terminal has been configured with the account for the DM server, and the account for the DM server comprises the identifier of the DM server, the authentication information for the DM server; and wherein the terminal uses the received configuration message for parameter configuration or management corresponding to a management object, the management object is sequenced by the DM server, and a virtual path to the sequenced management object is provided, wherein the virtual path corresponds to the management object on a Device Management Tree (DMT) on the terminal and is used to instruct the terminal to determine a basic path on the DMT and execute the management command.

* * * * *